UNITED STATES PATENT OFFICE.

FRIEDRICH KRECKE AND IGNAZ ROSENBERG, OF BIEBRICH, GERMANY, ASSIGNORS TO KALLE & CO., OF SAME PLACE.

BLUE-BLACK DISAZO DYE.

SPECIFICATION forming part of Letters Patent No. 546,068, dated September 10, 1895.

Application filed June 20, 1895. Serial No. 553,476. (Specimens.) Patented in Germany September 10, 1891, No. 73,901.

*To all whom it may concern:*

Be it known that we, FRIEDRICH KRECKE, doctor of philosophy, a subject of the King of Prussia, German Emperor, and IGNAZ ROSENBERG, doctor of philosophy, a subject of the King of Hungary, residing at Biebrich-on-the-Rhine, Germany, have invented certain new and useful Improvements in the Manufacture of Violet to Blue and Bluish-Black Disazo-Dye-Stuffs, (for which our assignees, KALLE & CO., have already obtained a patent in Germany, No. 73,901, dated September 10, 1891,) of which the following is a specification.

By employing the $alpha_1$ naphthylamin-$beta_4$ mono-sulfo-acid which may be obtained by nitration and reduction of naphthalene-beta-mono-sulfo-acid, instead of alpha-naphthylamin for the production of disazo-dye-stuffs of the general type of the naphthol-black series or related classes, we succeeded in producing a new class of coloring-matters which are technically of great value, because they dye more bluish and evener shades, which are much faster to milling than the shades of the colors belonging to the naphthol-black series and similar classes.

The members of our new class of coloring-matters have the $alpha_1$ $alpha_2$ disazonaphthalene-$beta_4$ sulfo-acid group in center position. They form, after drying and pulverizing, grayish-black to dark greenish-black amorphous powders which dye wool in an acid bath violet or blue to bluish-black shades. They are easily soluble in water and almost insoluble in alcohol. The violet or bluish aqueous solution turns more greenish on addition of ammonia. In concentrated sulfuric acid the new dye-stuffs dissolve with greenish-blue or green color.

To carry out our invention we act upon $alpha_1$ naphthylamin-$beta_4$ mono-sulfo-acid, which may be obtained by nitration and reduction of naphthalene beta-mono-sulfo-acid, with the disazo compounds of sulfo-acids belonging to the aromatic series, such as mono and disulfo acids of naphthylamin, the sulfo-acids of anilin, of ortho or para toludin, or with the diazo compounds of carboxy acids, such as amido salicylic acid, &c. The thus-obtained amido-azo bodies are then rediazotized and combined with alpha or beta naphthol or their sulfo-acids, with alpha or beta naphthylamin or their alkylated derivatives, with dioxynaphthalenes or amido-naphthols and their sulfo-acids. By these combinations the center group $alpha_1$ $alpha_2$ disazo naphthalene $beta_4$ sulfo-acid is formed from the molecule of the $alpha_1$ naphthylamin-$beta_4$ monosulfo-acid, and the thus-produced dye-stuffs contain this molecular arrangement as the most characteristic group. As an example, we shall describe the process employed for the manufacture of the sodium salt of di-sulfo-naphthalene-azo-sulfo-naphthalene-azo-beta-naphthol-beta-di-sulfo-acid, a coloring-matter dyeing a blue-black shade on wool in an acid bath. We dissolve 35 kilograms (thirty-five kilograms) of $alpha_1$ naphthylamine-$beta_2$ $beta_3$ disulfonate of sodium in 200 liters (two hundred liters) of water acidulated by 25 kilos (twenty-five kilograms) of muriatic acid of 20° Baumé and diazotize in the cold by addition of 7 kilos (seven kilograms) of sodium nitrite in aqueous solution. The diazo-naphthaline-di-sulfo-acid so obtained is stirred into a cold solution of 25 kilos (twenty-five kilograms) $alpha_1$ naphthylamin-$beta_4$ mono-sulfonate of sodium (which is obtained by nitration of naphthalene-beta-mono-sulfo-acid in sulfuric-acid solution and reduction of the resulting alpha-nitro-naphthalene-beta-mono-sulfo-acid) and 6 kilos (six kilograms) of soda-ash in 150 liters (one hundred and fifty liters) of water. After the mixture has been agitated some hours the formation of the amido-azo body is complete. The latter is then transformed into the diazo-azo body by addition of 30 kilos (thirty kilograms) of muriatic acid of 20° Baumé and 7 kilos (seven kilograms) of sodium nitrite in aqueous solution and mixed with a cold solution of 35 kilos (thirty-five kilograms) of beta-naphthol-beta-disulfonate of sodium (R-salt) and 10 kilos (ten kilograms) of soda-ash in 200 liters (two hundred liters) of water. The so-formed coloring-matter separates completely by itself from the solution and is filtered off, pressed, and dried. It forms a brownish-black amorphous powder with metallic luster. It dyes a blue-black shade on wool in an acid bath. It is easily soluble in water and almost insoluble in strong alcohol. The bluish-violet solution in water turns greenish-blue on addition of ammonia. The solution in concentrated sulfuric acid is green.

Now, what we claim is—

1. The process of manufacturing dis-azo-dyestuffs by reacting upon $alpha_1$ naphthylamin-$beta_4$ monosulfoacid, which may be obtained by nitration and reduction of naphthalene-beta monosulfoacid with the diazo-compound of sulfo- and carboxy acids of the aromatic series, such as naphthylamin-disulfoacid and amido-salicylic acid, rediazotizing the thus produced amido-azo-body and combining again with substances which are used for the manufacture of azo-dye-stuffs in the manner well known in the arts, such as alpha-, beta-naphthol, their sulfoacids, alpha-, beta-naphthylamin, their alkylated derivatives, dioxynaphthalenes, amidonaphthols and their sulfoacids, substantially as described.

2. As new articles of manufacture the class of disazodyestuffs containing the $alpha_1$ $alpha_2$ disazonaphthalene $beta_4$ sulfo-acid group in the center position forming after drying and pulverizing grayish-black to dark greenish-black amorphous powders, and dyeing wool in an acid bath violet to bluish black shades, easily soluble in water and almost insoluble in absolute alcohol, soluble in concentrated sulfuric acid with greenish-blue to green color, the violet or bluish aqueous solution turning more greenish on addition of ammonia.

3. As a new article of manufacture the specific disazo dyestuff with the formula

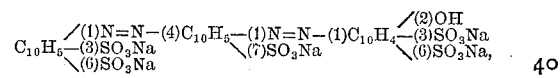

which forms after drying and pulverizing a brownish-black amorphous powder with metallic luster, soluble in water, nearly insoluble in strong alcohol, soluble in strong sulfuric acid with green coloration, the bluish-violet solution in water turning greenish blue on addition of ammonia,—forming when treated with strong reducing agents, $alpha_1$ $alpha_2$ naphthylene diamine $beta_4$ mono sulfo acid besides a naphthylamin-and amido-naphthol-disulfo-acid,—dyeing wool in an acid bath a very even blue black shade fast against milling, which dyestuff may be produced from $alpha_1$ naphthylamin $beta_2$ $beta_3$ disulfoacid and $alpha_1$ naphthylamin $beta_4$ monosulfoacid and betanaphthol beta disulfoacid, substantially as described.

In testimony whereof we have signed our names to this specification in the presence of two subscribing witnesses.

FRIEDRICH KRECKE.
IGNAZ ROSENBERG.

Witnesses:
CARL ED. HAHN,
HEINRICH MISCHLER.